United States Patent
Rutherford

[19]

[11] Patent Number: 5,934,617
[45] Date of Patent: Aug. 10, 1999

[54] DE-ICE AND ANTI-ICE SYSTEM AND METHOD FOR AIRCRAFT SURFACES

[75] Inventor: Robert B. Rutherford, Kirtland, Ohio

[73] Assignee: Northcoast Technologies, Chardon, Ohio

[21] Appl. No.: 08/935,165

[22] Filed: Sep. 22, 1997

[51] Int. Cl.⁶ .............................. B64D 15/00; B64C 1/00
[52] U.S. Cl. ............................. 244/134 E; 244/134 D; 244/134 R; 244/123
[58] Field of Search .......................... 244/134 R, 134 D, 244/134 E, 123, 133; 219/202, 535, 548, 553

[56] References Cited

U.S. PATENT DOCUMENTS

| | | |
|---|---|---|
| 2,406,367 | 8/1946 | Griffith et al. . |
| 2,454,874 | 11/1948 | Hunter . |
| 2,464,273 | 3/1949 | Tanchel . |
| 2,590,944 | 4/1952 | Cowdrey et al. ................... 244/134 D |
| 2,665,090 | 1/1954 | Holdaway et al. . |
| 2,686,640 | 8/1954 | Neel, Jr. et al. ..................... 244/134 D |
| 2,787,694 | 4/1957 | Farries . |
| 2,791,668 | 5/1957 | Cowdrey et al. . |
| 3,178,560 | 4/1965 | Mapp et al. . |
| 3,397,302 | 8/1968 | Hosford . |
| 3,404,061 | 10/1968 | Shane et al. . |
| 3,553,834 | 1/1971 | Olstrowski . |
| 3,719,608 | 3/1973 | Olstowski . |
| 3,748,522 | 7/1973 | Geppert . |
| 4,021,008 | 5/1977 | Eichenauer ........................... 244/134 D |
| 4,181,583 | 1/1980 | Steiger et al. . |
| 4,250,397 | 2/1981 | Gray et al. . |
| 4,282,184 | 8/1981 | Fiegl et al. . |
| 4,490,828 | 12/1984 | Fukuhara et al. . |
| 4,659,421 | 4/1987 | Jewett . |
| 5,022,612 | 6/1991 | Berson . |
| 5,100,737 | 3/1992 | Colombier et al. . |
| 5,192,605 | 3/1993 | Mercuri et al. . |
| 5,198,063 | 3/1993 | Howard et al. . |
| 5,344,696 | 9/1994 | Hastings et al. . |
| 5,475,204 | 12/1995 | Giamati et al. .......................... 219/548 |
| 5,544,845 | 8/1996 | Giamati et al. . |
| 5,584,450 | 12/1996 | Pisarski . |
| 5,629,559 | 5/1997 | Miyahara . |
| 5,657,951 | 8/1997 | Giamati .......................... 244/134 E X |

FOREIGN PATENT DOCUMENTS

| | | |
|---|---|---|
| WO 94/26590 | 11/1994 | WIPO . |
| WO 95/15670 | 6/1995 | WIPO . |

OTHER PUBLICATIONS

Aircraft Icing Handbook, Report # DOT/FAA/CT-88/8-2, III 2, pp. 1-6, 9, 15-17, 21,23-26.
Aerospace Engineering, May 1997, pp. 9-10.
G-IV Pilot Training Manual, Gulfstream Aircraft.
Specification Staystik™ Thermoplastic Adhesives, Alpha Metals.
Grafoil® Brand Flexible Graphite, Engineering Design Manuel, Volume One (UCAR Carbon Company).
Grafoil® Flexible Graphite Materials (UCAR Carbon Company).

*Primary Examiner*—Harold J. Tudor
*Assistant Examiner*—Theresa M. Wesson
*Attorney, Agent, or Firm*—Jones, Day, Reavis & Pogue

[57] ABSTRACT

A thermal de-ice and anti-ice system for aircraft surfaces employs a laminate in which flexible expanded graphite foil is an electrical and heat conducting layer that is disposed below an outer heat conducting layer, with an electrically insulating layer below the graphite layer. The flexible expanded graphite layer requires about three times less wattage than known resistance heating pad thermal systems to achieve de-ice and/or anti-ice temperatures. The temperature of the surface is controlled by varying the power supplied to the flexible expanded graphite layer of the laminate in response to a real time temperature value transmitted to a power control.

38 Claims, 5 Drawing Sheets

DE-ICE AND ANTI-ICE SYSTEM AND METHOD FOR AIRCRAFT SURFACES

BACKGROUND OF THE INVENTION

Aircraft, during flight and/or while on the ground, may encounter atmospheric conditions that cause the formation of ice on airfoils and other surfaces of the aircraft structure, including wings, stabilizers, rudder, ailerons, engine inlets, propellers, rotors, fuselage and the like. Accumulating ice, if not removed, can add excessive weight to the aircraft and alter the airfoil configuration, causing undesirable and/or dangerous flying conditions. Since the earliest days of flight, attempts have been made to overcome the problem of ice accumulation. However, available de-ice and/or anti-ice systems have usually been reserved for large aircraft because expense and added weight have made them impractical for general aviation single engine and light twin airplanes and helicopters.

Several approaches have been used to provide de-ice and/or anti-ice systems for modern aircraft and these are generally categorized as mechanical, chemical or thermal. One commonly used system for de-icing is the mechanical removal of ice with pneumatic boots. In this system, the leading edge zone or wing or strut component of an aircraft is covered with a plurality of expandable cuffs that are inflatable with a pressurized fluid, such as air. When inflated, the cuffs expand and crack accumulating ice which is then dispersed into the air stream. Although pneumatic boots have been used on commercial aircraft and some light twin or small jet aircraft, the system, which requires an air compressor and vacuum system, is expensive and adds appreciable weight to light aircraft. A similar mechanical system employs multiple juxtaposed electro-expulsive elements placed within an elastomeric or metal clad boot that is attachable to airfoil surfaces. When an electrical impulse is applied, the force effects an impulse separation of one element from the other that is sufficient to mechanically throw off thin accretions of ice. In each of these mechanical systems, boot operation affects the airfoil characteristics of the wing, with the result that the boots cannot be operated during landing or takeoff.

Another mechanical system for removing ice that has already formed employs a composite leading edge with a titanium skin. Under the skin are located tubes through which air is pulsed at high force, creating a shock wave that throws off thin accretions of ice into the air stream. Although this system is lighter than either the pneumatic boot or the electro-expulsive system, it is also expensive for small aircraft because of the expense of the titanium skin.

In addition to the drawbacks of the added weight and expense of current mechanical ice removal systems, each of these systems requires visual attention to the degree of ice build-up and careful timing of activation for maximum effectiveness. Moreover, none of these systems are suitable for use as an anti-ice system (i.e. to prevent ice from forming).

Another common approach for de-icing and/or anti-icing aircraft surfaces involves the application of a chemical, such as alcohol, to reduce adhesion forces associated with ice accumulation and/or depress the freezing point of water collecting on the surfaces. Such systems may be used while the aircraft is on the ground or in flight. For example, one system prevents the build-up of ice on the leading edges of airfoil surfaces, including propeller and rotor blades, by the weeping of alcohol from a plurality of holes in an attached titanium cuff. Drawbacks of such on-board chemical systems include their expense and the necessity to rely on a finite supply of chemical during flight.

Potential thermal anti-ice or de-ice systems have been reported. One such system, limited to turbine aircraft, diverts bleed air or hot air from one of the turbine stages to heat the airfoil leading edges. Other thermal systems employ electrically conducting resistance heating elements, such as those contained in heating pads bonded to the leading edges of the aircraft or on the propeller or rotor blades, or those incorporated into the structural members of the aircraft. Heating pads of this type usually consist of an electrically conductive material in contact with wire or other metal heating elements dispersed throughout the conductive layer which is sandwiched between two layers of insulation. Electrical energy for the heating elements is derived from a generating source driven by one or more of the aircraft engines. The electrical energy is continuously supplied to provide heat sufficient to prevent the formation of ice or intermittently supplied to loosen accumulating ice. However, such systems are only usable where sufficient wattage is available to raise and/or maintain the temperature of the airfoil surface above the freezing point at typical aircraft speeds. For example, an anti-ice system that is continuously on during icing conditions should ideally maintain a surface temperature of approximately 100° F. to 180° F., as suggested by The National Aeronautic and Space Administration (NASA), or, more typically, at 100° F. to 130° F., as required for the Gulfstream IV aircraft, stated in the Gulfstream Pilot Operating Handbook. An ideal thermal de-ice system should be capable of maintaining a temperature of 100° F. to 150° F. during icing conditions.

To achieve temperatures such as those described above, the power supply required to power a wire heating pad type anti-ice or de-ice system is large, because of the inefficiencies of the resistive heating pad elements. For example, the wattage required for an anti-ice system in a typical high-performance single engine or light twin aircraft, using the above-described resistance heaters, is approximately 21,000 watts. Current power systems in such aircraft can supply a maximum of only about 7,000 watts. A typical general aviation light aircraft with an approximate anti-ice area of 1,400 square inches, using pad heaters, requires approximately 15 watts per square inch to reach anti-ice temperatures. Known heating pad systems supply only 2 to 3 watts per square inch at the power supplied by these aircraft. Therefore, typical resistance pad heaters have not been a feasible alternative as anti-ice or de-ice systems for general aviation aircraft.

Another drawback to typical thermal systems is the tendency for the protective covering to break down due to cutting, abrasion and erosion, causing heating wires to break. One thermal system attempts to overcome this problem by employing an epoxy composite material containing an integral heating layer comprising a mat of non-woven conductive metal-coated fibers, such as nickel-coated chopped graphite fibers, whose random orientation ensures that electrical connection is maintained if a single, or even many, connections are broken. However, this system requires extensive preparation of aluminum aircraft surfaces before application.

In view of the foregoing, there is a need for an inexpensive and efficient on-board system that provides both de-ice and anti-ice capabilities for general aviation aircraft, that is light in weight, that operates efficiently using the power supply currently available on these aircraft, that does not change the contour of the airfoil surface, and that is abrasion and wear resistant.

SUMMARY OF THE INVENTION

The invention provides a unique laminate for bonding to the surface or portion of the surface of an aircraft to control the temperature of the surface and prevent the formation of and/or the accumulation of ice during in-flight or on the ground conditions. Although the laminate is herein described for use on aircraft surfaces, the laminate may be used for any surface which requires anti-ice or de-ice capability and where a power source is available. Such applications include roofs, gutters, pipes, automobile hoods and trunks, and the like.

The laminate comprises a thin, electrically conductive layer of flexible expanded graphite foil, also known as vermiform graphite, laminated to an outer heat conducting layer that seals the interior of the laminate against penetration and water damage. The laminate is bonded, such as by an adhesive, to an electrically insulating layer such that the flexible expanded graphite layer is disposed below the heat conducting outer layer, with the electrically insulating layer below the graphite layer. The insulating layer may be directly bonded to the laminate to form a third layer before application to the aircraft surface. Alternatively, the insulating layer may be a component of the aircraft surface to which the two-layer laminate is applied. The term "laminate", as used in the context of this invention, includes a laminate comprising the flexible expanded graphite, the heat conducting outer layer and the electrically insulating layer regardless of the form taken by the insulating layer.

The heat conducting outer layer may comprise any heat conducting material that is essentially an electrical nonconductor. Preferably, the heat conducting outer layer comprises a thermoplastic or thermoset material containing a heat conducting inorganic filler. More preferably, the heat conducting layer comprises a thermoplastic material, such as polyurethane, with a filler selected from aluminum nitride, boron nitride, alumina, and the like.

The flexible expanded graphite foil layer has a resistivity of about $1 \times 10^{-4}$ ohm-in. to about $10 \times 10^{-4}$ ohm-in. and is fully electrically conducting without the necessity of including wire elements, metals or heat conducting fibers within or through the layer. Thus, the problems associated with the high power supply requirements and wear potential associated with previous heating pad systems employing individual wires or metallic fibers is eliminated. Moreover, the flexible expanded graphite foil is a readily commercially available material that is relatively inexpensive. Because flexible expanded graphite foil is well suited, in terms of surface area to volume, for conducting heat and electricity, the wattage required for producing a rapid rise in temperature from ambient to that required for anti-ice and de-ice systems over a large surface area is far less than that required by known electrical wire heating systems. The temperature requirements for both general aviation aircraft, including high-performance aircraft, twin engine aircraft and helicopters, and commercial aircraft anti-ice and de-ice systems are met or exceeded by the instant laminate system.

The laminate is preferably supplied as a two-layer or three-layer tape, as described above, for easy application using commercially available adhesives, such as rubber-based adhesives, to any surface of the aircraft, including the fuselage, wings, ailerons, propeller or rotor blades, tail sections, including stabilizers and rudder, engine cowling, oil pan, and the like. The combination of the flexibility of the expanded graphite, the heat conducting outer layer, with or without a flexible electrically insulating layer, provides a laminate that is easy to die cut to size and configure to a variety of aircraft structural shapes, including control surfaces and other irregularly shaped removable and movable components. The laminate is also light in weight and inexpensive compared to existing de-ice and anti-ice systems.

The invention provides a de-ice and anti-ice system for aircraft that comprises the aforementioned laminate bonded to a surface of an aircraft structure, a power source electronically connected to the flexible expanded graphite layer, a programmable power control for controlling the delivery of electrical energy to the graphite layer, and a temperature sensor for real time transmitting of the temperature of an outer surface of the heat conducting layer. The power control is programmed to provide more or less electrical energy to the flexible expanded graphite layer of the laminate to raise and maintain the temperature of the outer surface of the heat conducting layer within a predetermined temperature range.

DETAILED DESCRIPTION OF THE INVENTION

Figure 1:
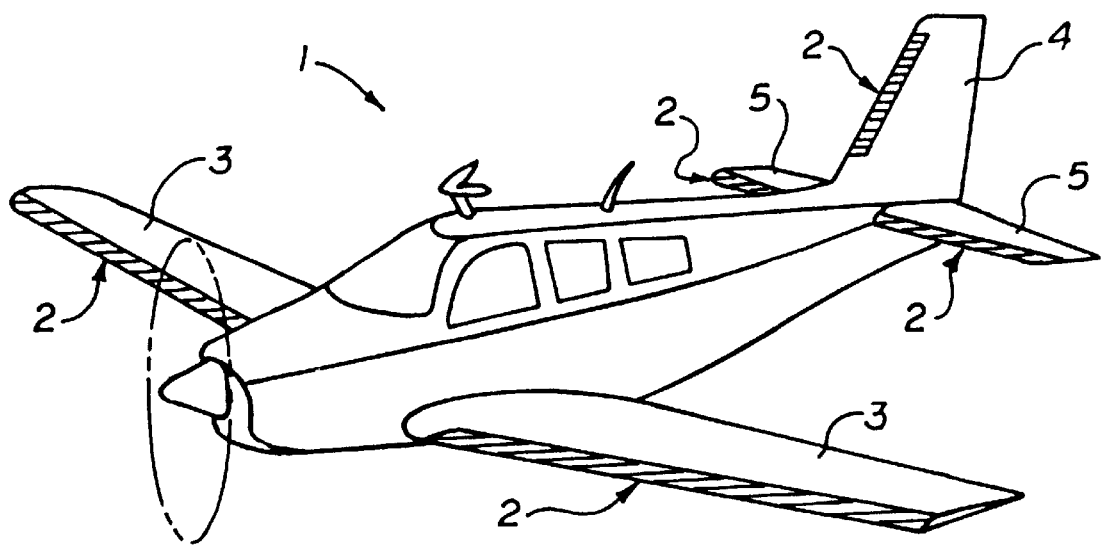
FIG. 1 is a schematic illustration of a single engine aircraft having the laminate of the invention bonded to the leading edges of the wings, rudder and stabilizers.
Figure 2:
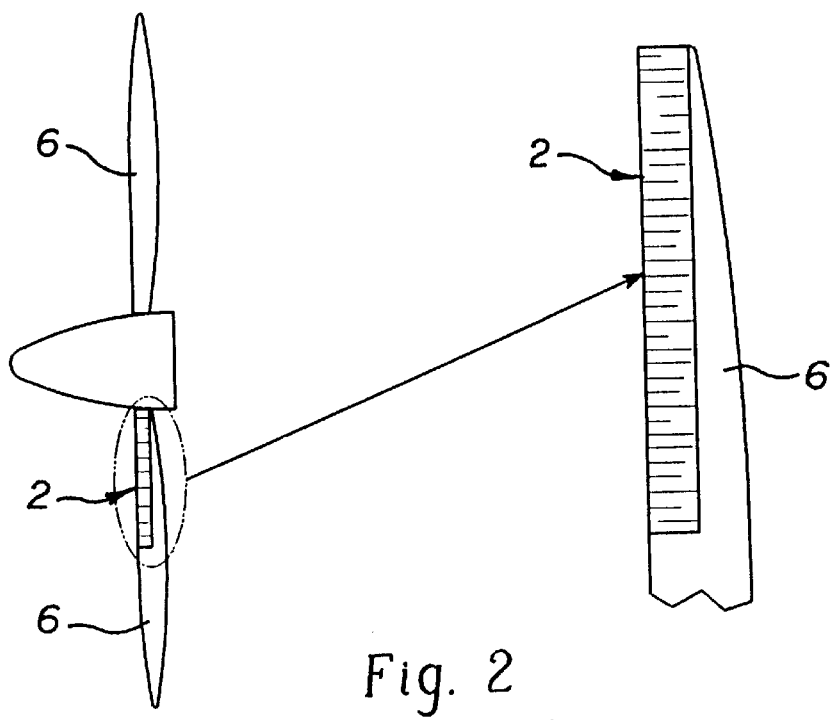
FIG. 2 is a schematic illustration of a propeller blade having the laminate of the invention bonded to a leading edge.
Figure 3A:
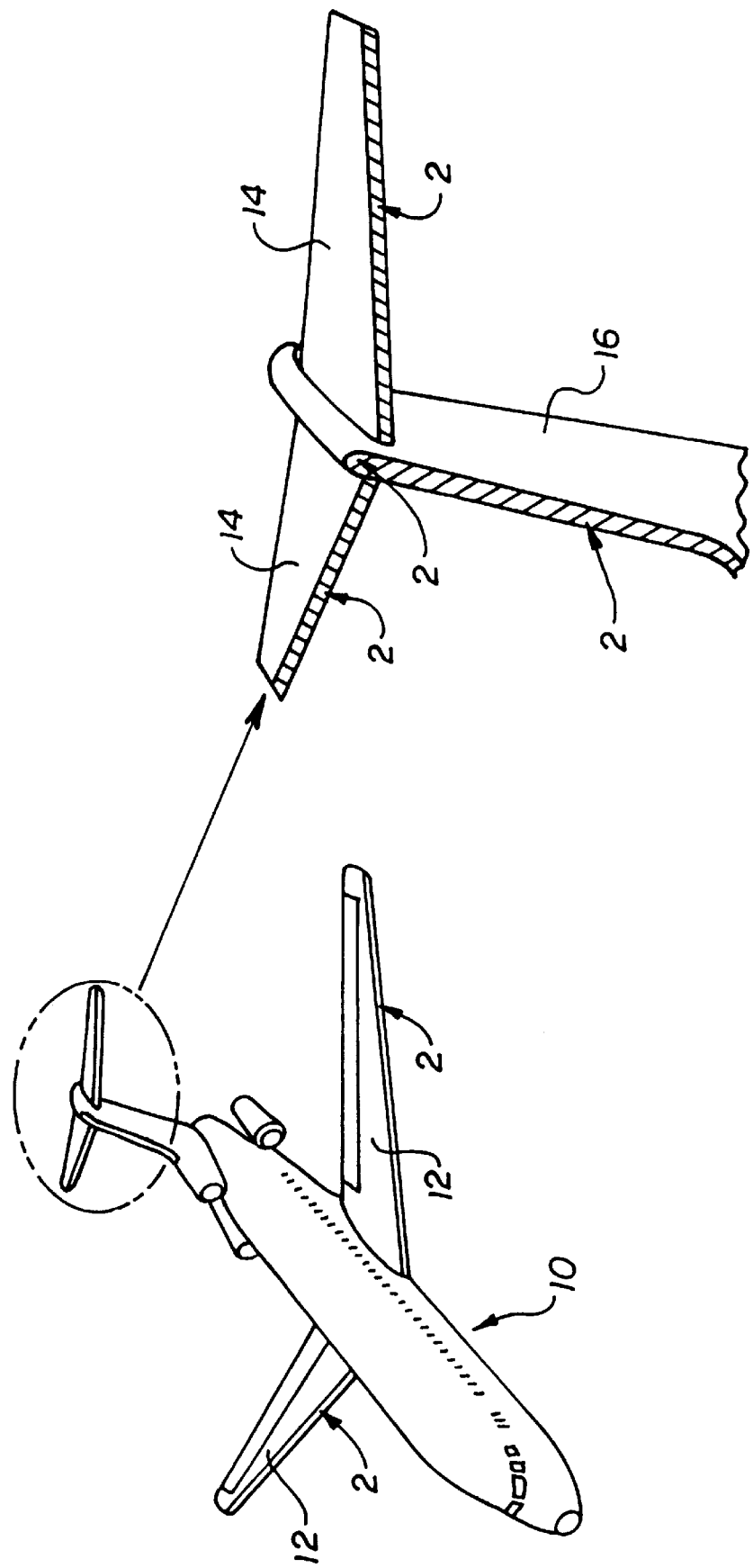
FIG. 3A is a schematic illustration of a jet aircraft having the laminate of the invention bonded to the leading edges of the wings, rudder and stabilizers.

The invention provides a thermal de-ice and anti-ice system for aircraft surfaces, employing a laminate in which flexible expanded graphite foil is an electrical and heat conducting layer that is disposed between an outer heat conducting layer and an electrically insulating layer that is bonded to or is a component of the aircraft surface. The laminate may be bonded to any surface or partial surface of any aircraft structure that is subject to the formation of ice. For example, as illustrated in FIGS. 1 and 2, structural areas to which the laminate 2 is may be applied to a light aircraft 1 include, but are not limited to, the leading edges of the wings 3, rudder 4, stabilizers 5 and propeller blades 6, as well as other structures, such as the oil pan. As illustrated in FIG. 3A, the laminate 2 may also be applied to any structural area subject to icing in a commercial aircraft 10 including, without limitation, the leading edges of the wings 12, stabilizers 14 and rudder 16 sections, as well as other surfaces, including ailerons, flaps, engine cowling, and the like. The tail structures on commercial aircraft have historically been the most susceptible to in-flight ice hazards.

Figure 3B:
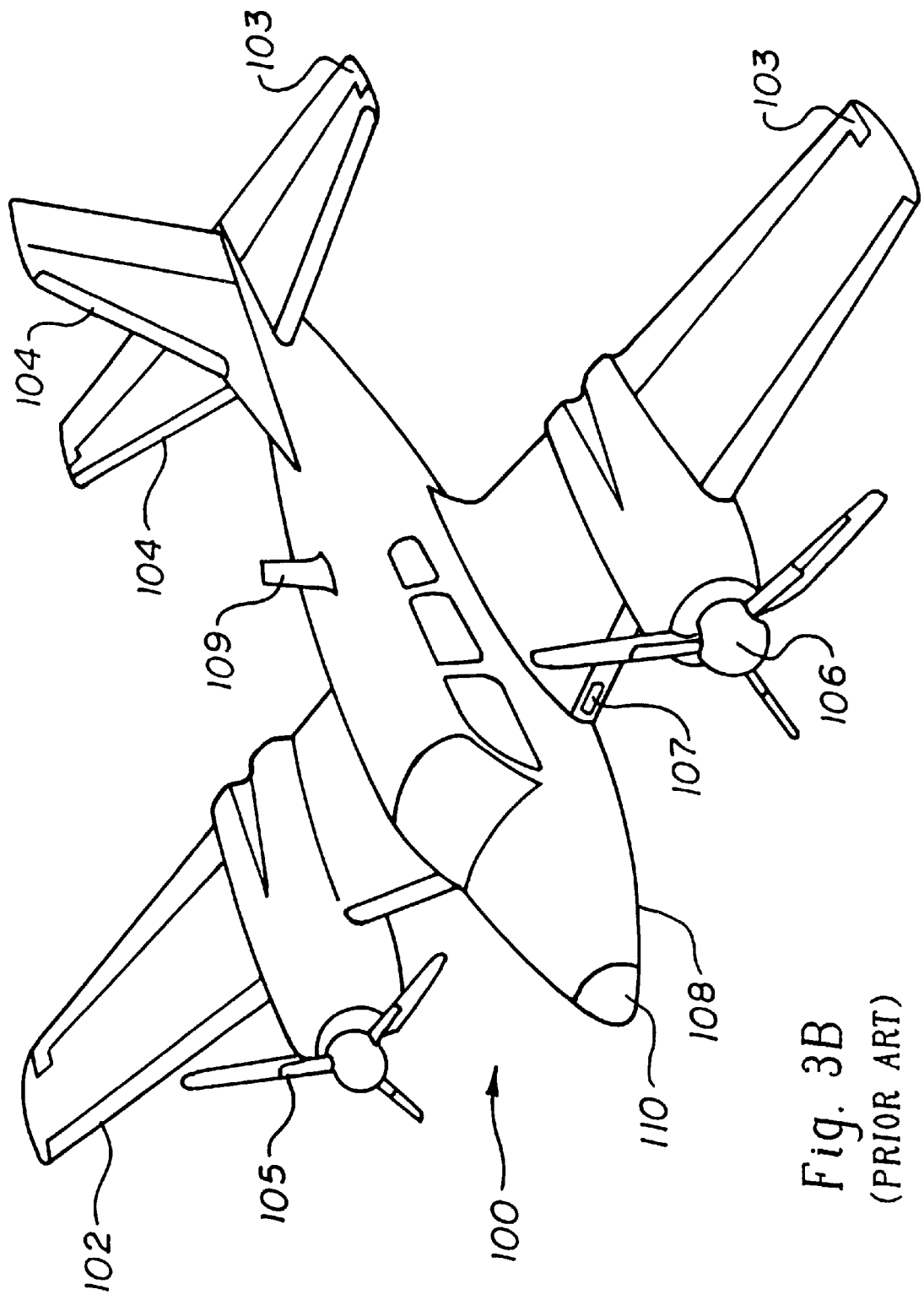
FIG. 3B is a schematic illustration of further areas to which the laminate of the invention may be bonded to an aircraft, such as the leading edges of the wings, rudder, stabilizers, engine air inlets, auxiliary air inlets, propellers, antennas, balance horns, essential instruments and radome.

As illustrated in FIG. 3B, further structural areas to which the laminate 2 may be applied to a light aircraft, such as a twin engine aircraft 100 include, but are not limited to, the leading edges of the wings 102, empennage leading edges 104 of the rudder and stabilizers, balance horns 103, propeller blades 105, engine air inlets 106, as well as other structures, including auxiliary air inlets 107, essential external instruments 108, antennas 109 and oil pan (not shown). Because an electrical current applied to the flexible graphite layer of the laminate does not produce a magnetic field, the laminate may also be applied for de-icing and preventing the formation of ice on magnetically sensitive portions of the aircraft structure, such as a radome 110.

Flexible expanded graphite foil sheets for use in the laminate may be prepared, as is well known, by expanding graphite flakes many times and then compressing the expanded flakes to form a cohesive structure. The expansion of graphite flakes can be readily achieved by attacking the bonding forces between the layers of the internal structure of graphite, such as by the use of an acid. The result of such an attack is that the spacing between the superimposed layers can be increased so as to effect a marked expansion in the crystalline structure. By means of an intercalation or "between the layers" compound formation, subsequent high temperature heating effects a 100–1000 fold greater expansion, producing a worm-like or vermiform structure with highly active, dendritic, rough surfaces which may then be formed under pressure into a foam material, since the particles have the ability to adhere without a binder due to the large expansion. Sheets, and the like, are formed from the expanded graphite particles by simply increasing the compressive pressure, the density of the formed graphite being related to the applied formation pressure. A more complete description of the method of forming such flexible expanded graphite sheets can be found in U.S. Pat. No. 3,404,061.

The flexible expanded graphite sheet product is essentially pure graphite, typically 90–99.9% elemental carbon by weight, with a highly aligned structure. Only naturally occurring minerals (from the natural raw graphite materials) remain as impurities in the product in the form of essentially inert, chemically stable metal oxides and sulfate. The presence of these impurities is not essential to and does not contribute to the electrical and heat conducting capabilities of the expanded graphite.

Although any suitable flexible expanded graphite sheet may be used in the present invention, it is preferred that the characteristics of the flexible expanded graphite sheet be equivalent to that provided as Grafoil® Brand Flexible Graphite, manufactured by UCAR Carbon Company. The density of the preferred flexible expanded graphite is about 50 to 90 lb. per cubic foot, preferably about 70 lb. per cubic foot. The preferred flexible expanded graphite foil has an electrical resistivity of about $1 \times 10^{-4}$ to about $10 \times 10^{-4}$ ohm-in., preferably about $2.8 \times 10^{-4}$ to about $7.5 \times 10^{-4}$ ohm-in. and, more preferably, about $3.1 \times 10^{-4}$ to about $6.5 \times 10^{-4}$ ohm-in. The preferred flexible expanded graphite foil has a thermal conductivity of about 140 W/M°C. at 70° F. and about 44 W/M°C. at 2000° F. Because of its excellent heat conducting properties, flexible expanded graphite has been used in other applications, such as gaskets, valve stem or pump packings, and high temperature applications, such as thermal radiation shielding, furnace linings, and the like.

Figure 4:
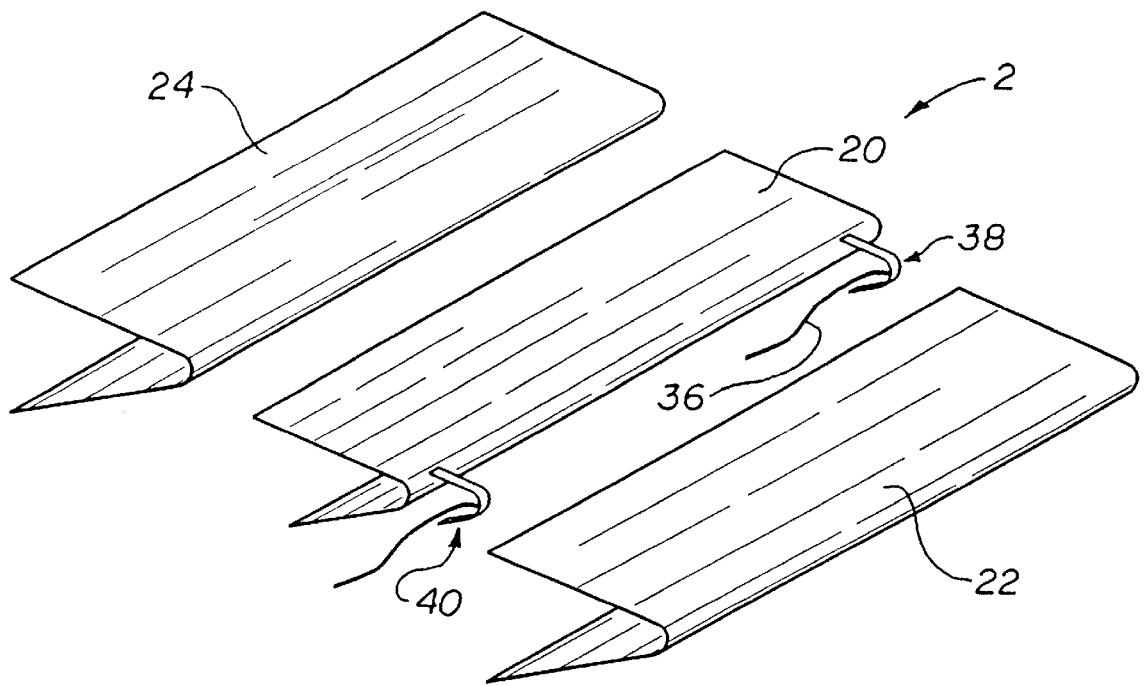
FIG. 4 is a schematic illustration of the components of the laminate, including the flexible expanded graphite layer, the heat conducting outer layer and the electrically insulating layer.
Figure 5:
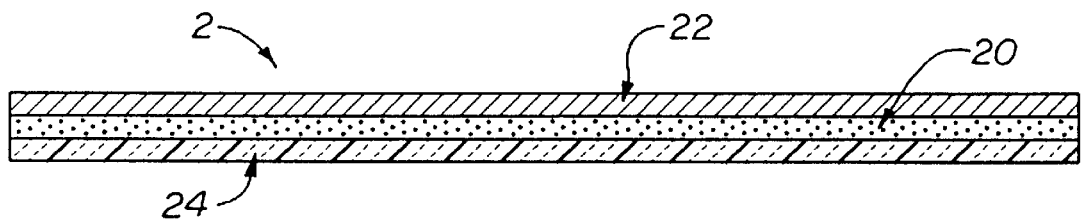
FIG. 5 is a cross section of the three-layer laminate illustrating the flexible expanded graphite layer disposed between the heat conducting outer layer and the insulating layer.
Figure 6:
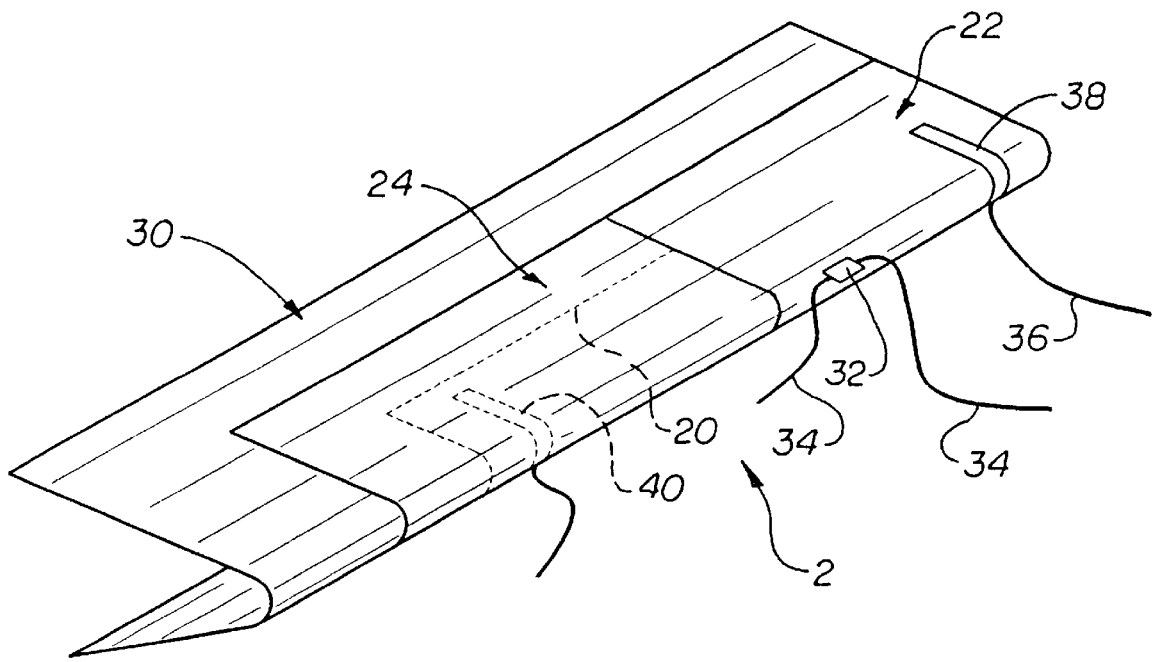
FIG. 6 is a schematic cut-away illustration of a wing section having the laminate of the invention bonded to a portion of the leading edge surface.

The structural components of the laminate of the invention are illustrated in FIGS. 4 and 5. The laminate comprises a flexible expanded graphite foil sheet layer 20 laminated to an outer heat conducting layer 22 and disposed between the outer layer 22 and an electrically insulating layer 24. The insulating layer 24 is bonded directly to an aircraft surface, such as a leading edge section of an aluminum wing 30, as illustrated in FIG. 6. Bonding of the insulating layer 24 to the aircraft surface may be achieved by means of, for example, any rubber-based adhesive that maintains its bonding capability over a wide range of temperatures. An example of a readily available suitable adhesive is the rubber-based contact adhesive 1300-L (3M Company).

When the aircraft structure already has an electrically insulating component, a two-part laminate may be used that comprises the flexible expanded graphite layer 20 and the heat conducting outer layer 22. For example, the aircraft surface may be painted or otherwise coated with an electrically insulating material, such as a polyurethane paint or an aluminized paint. The flexible expanded graphite layer 20 and/or the heat conducting outer layer 22 is/are then bonded directly to the insulating component of the aircraft structure, with a rubber-based adhesive. Alternatively, the aircraft structure itself may be manufactured of an electrically non-conducting composite, such as fiberglass reinforced plastic, or the like. In this case, the flexible expanded graphite foil sheet may be embedded in the composite during its manufacture, by methods known to those skilled in the art of composites, and a heat conducting outer layer may be later painted or sprayed on or bonded to the composite surface with an adhesive. In this embodiment, the flexible expanded graphite foil sheet is in close proximity to or in contact with the heat conducting layer in order to transfer heat to this layer. Examples of suitable paint or spray-on heat conducting layers include polyurethane-based or aluminized paints, that contain inorganic fillers, such as aluminum nitride.

The flexible expanded graphite foil sheet has a thickness in the laminate of about 0.025 to about 0.125 inches, preferably about 0.003 to about 0.070 inches and, more preferably, about 0.003 to about 0.030 inches. The thickness of the heat conducting outer layer is preferably about 0.001 inches to about 0.030 inches and, more preferably, about 0.001 inches to about 0.010 inches. The electrically insulating layer has a thickness of about 0.005 inches to about 0.250 inches.

The outer heat conducting layer 22 is preferably a thermoplastic or thermosetting material, including rubber or other elastomeric materials, which is a thermal conductor and an electrical insulator, and is durable and abrasion-resistant. Suitable materials include polyurethane, polyethylene, polyvinyl chloride, polyamides, polystyrenes, and the like. The preferred material is essentially non-electrically conducting, having a volume electrical resistivity of about $10^3$ ohm-in. to about $10^{12}$ ohm-in. The preferred outer heat conducting layer has a thermal conductivity of about 0.1 watts/meter°K (W/M°K) to about 5 W/°K and, more preferably, about 0.5 W/M°K to about 4 W/M°K. In order for the material to be heat conducting and electrically non-conducting, a heat-conductive inorganic compound or mixture of heat-conductive inorganic compounds is typically added as a filler during the manufacture of the material. Examples of inorganic compounds employed as fillers to confer these properties on a thermoplastic or thermosetting material are nitrides, such as aluminum nitride and boron nitride, alumina, silicon compounds, and the like. The manufacture of such thermoplastic and thermosetting materials containing these fillers is known to those skilled in the art of plastics compounding. Preferably, the heat conducting outer layer in the laminate of the invention comprises a thermoplastic material containing aluminum nitride, boron nitride, alumina, or mixtures of these, such as a Staystik™ thermoplastic adhesive, available from Alpha Metals, Inc., Cranston, R.I. The thermoplastic material may be in liquid, film or paste form. More preferably, the heat conducting outer layer comprises a polyurethane film containing boron nitride or aluminum nitride. Most preferably, the polyurethane contains boron nitride.

The heat conducting outer layer is preferably laminated under heat and pressure to the flexible expanded graphite layer to ensure the integrity of the heat transfer between the flexible expanded graphite foil sheet layer and the protective heat-conducting outer layer. Moreover, lamination of the outer layer to the foil substantially prevents the flaking off of pieces of the foil to assure a continuous foil layer for optimum electrical and heat conductivity. For example, a thermoplastic adhesive (Staystik™) may be suitably laminated to the flexible expanded graphite layer under heat and pressure conditions of 125°–200° C. and 0–10 psi, respectively.

The insulating base layer 24 may be comprised of any of a number of materials that are insulating for electricity, that are flexible enough to facilitate the installation of the laminate onto irregularly shaped aircraft surfaces, and can be bonded, such as by an adhesive, to the heat conducting outer layer and/or to the flexible expanded graphite layer. The electrically insulating material may or may not be also heat insulating. For example, it may be desirable to heat the aircraft surface under the laminate. In this case, the selection of the electrically insulating layer includes a material that is not heat insulating. Suitable insulating base layers include, but are not limited to, elastomers, such as chloroprene, isoprene and neoprene, or thermoplastic or thermosetting materials containing inorganic heat conducting fillers, alone or in combination with insulating fabrics, such as fiberglass cloth.

As further illustrated in FIG. 6, in order to assess, in real time, the amount of heat generated on the aircraft surface 30 treated by the laminate 2, a temperature sensor, such as one or more thermocouples 32 of known types, may be included in one or more areas of the laminate 2. Temperature sensors other than thermocouples may be used in the invention and these are well known to those skilled in the art. In one embodiment of the invention, a bondable foil thermocouple 32 is incorporated into the laminate at an outer surface of the outer heat conducting layer and thermocouple control wires 34 may be routed with the electrical wires to a control system (see below). Temperature sensors can also be bonded within the laminate. The temperature sensor is ideally thin and flat and can sense temperatures up to 150° C. A suitable thermocouple sensor for use in the invention is a self-adhesive Omega iron/constantan thermal couple (omega Engineering, Inc., Stamford, Conn.).

Figure 7:
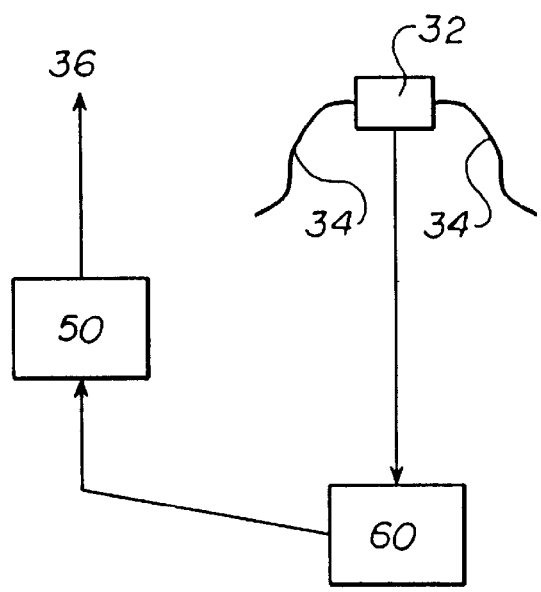
FIG. 7 is a schematic illustration of a power source and a programmable power control electronically connected to the flexible expanded graphite layer of the laminate and a temperature sensor, respectively.

In order to selectively control the temperature of a surface to which the laminate is applied, the flexible expanded graphite layer is electronically connected to a source of electrical energy 50. The connection may be electrical, such as by electrical wires, or may be accomplished by infrared or ultrasonic remote control, by known means. For example, as illustrated in FIGS. 6 and 7 the flexible expanded graphite layer 20 is connected to the power source 50 using an edge connector or bus bar 38 and wiring system 36. The pliable wiring and bus arrangement connects the flexible expanded graphite layer to a main grid (not shown). Another edge connector or bus bar 40 is riveted to the metal aircraft section to provide a ground for the electrical circuit. If desired, electrical connectors can also be employed to facilitate removal of the wiring from the laminate.

The temperature of the aircraft surface may be controlled by varying the voltage applied to the flexible expanded graphite layer of the laminate over a fixed or varied amount of time or by providing a constant voltage for a series of fixed intervals or time. The amount of wattage supplied to the flexible expanded graphite layer can be varied in response to the outer surface temperature using a programmable power control logic system 60, such as a microprocessor.

Thus, in a preferred embodiment, a system for preventing the formation of ice on or removing ice from an aircraft surface comprises the laminate described above, bonded to an aircraft surface; a power source; an electronic connection for connecting the flexible expanded graphite layer to the power source; a programmable power control for controlling the delivery of electrical energy from the power source to the flexible expanded graphite layer; a temperature sensor in communication with an outer surface of the heat conducting layer and in electronic communication with the power control for real time transmitting to the power control of a value representing the temperature of the outer surface of the heat conducting layer, wherein the power control further comprises a receiving unit for receiving the real time temperature value; wherein the power control is programmed to store a predetermined reference temperature range; the power control is further programmed to compare the received real time temperature value with the predetermined reference temperature range; the power control is further programmed to indicate an acceptable temperature when the received temperature value falls within the reference range; and the power control is further programmed to signal the power source to provide more or less electrical energy to the flexible expanded graphite layer of the laminate when the received temperature falls outside the reference temperature range.

The system may further comprise one or more sensors for sensing icing conditions when ice-producing combinations of ambient temperature, humidity and dew point exist in the atmosphere encountered by the aircraft. The sensor(s) is preferably programmed to signal the power source to provide electrical energy to the flexible expanded graphite layer of the laminate when icing conditions are sensed.

A preferred method for preventing the formation of or removing ice from a surface of an aircraft comprises the steps of bonding to the surface the laminate described above; providing an electronic connection between the flexible expanded graphite layer and a power source to provide electrical energy to the flexible expanded graphite layer, wherein the temperature of an outer layer of the heat conducting layer can be changed upon application of the electrical energy; providing sufficient electrical energy to the flexible expanded graphite layer to raise the temperature of an outer surface of the heat conductive outer layer and to maintain the temperature of the outer surface at about 33° F. to about 250° F., preferably about 50° F. to about 200° F. Depending on the type of aircraft and the typical aircraft speeds, as well as to meet the NASA and, for example, the Gulfstream requirements described above, for de-ice and/or anti-ice systems, the temperature is preferably raised to and maintained at about 100° F. to about 180° F., about 100° F. to about 150° F., or about 100° F. to about 130° F.

The provided electrical energy to achieve the above temperature is about 200 watts to about 50,000 watts. For example, a propeller blade made of a composite material to which the laminate of the invention is applied, would require only about 200 watts to achieve a temperature of 33° F. or higher, whereas a commercial jet could require up to about 50,000 watts to raise and maintain the temperature at an appropriate anti-ice or de-ice temperature at typical aircraft speeds. The wattage required depends upon the aircraft type, the ambient temperature, and the aircraft speed and the required temperature for de-ice and/or anti-ice capability. As described above, the amount of wattage to prevent the formation of ice in a typical high-performance single engine or light twin aircraft is approximately 21,000 watts. Current technology supplies a maximum of about 7,000 watts. Therefore, to achieve the above temperatures, the supplied wattage for a general aviation aircraft could vary from about 2,400 watts to about 21,000 watts or, for example, 4,000 watts to about 7,200 watts.

The wattage requirements of the laminate of the invention are much less than the wattage requirements of the known electrical heating pads previously proposed for aircraft de-ice and/or anti-ice systems. For example, the following comparison is made between the laminate of the invention employing the flexible expanded graphite and a typical silicone rubber wire heating pad, each covering a surface area of 80 square inches (4 inches×20 inches) and each required to raise the temperature of the surface from 31° F. (in ice) to 94° F. in 90 seconds. The silicone rubber wire heater requires 1233 watts, or 15 watts per square inch; whereas the laminate employing flexible expanded graphite requires only 450 watts, or 5.6 watts per square inch. Therefore, the laminate of the invention requires approximately one-third of the wattage of conventional heaters to create the same process heat.

The following example illustrates the de-ice and anti-ice capability of the laminate of the invention. This example is not to be considered limiting, however, as other heat conducting outer layers, adhesives, insulating layers, thicknesses, and the like, may be used in the practice of the invention.

EXAMPLE

An exemplary test of the de-ice and anti-ice capability of the laminate of the invention was conducted by applying the laminate, in tape form, to a portion of the leading edge of the aluminum wing of a Cessna 182R aircraft. A Grafoil™ sheet, measuring 4 inches wide by 20 inches long and 0.003 inches thick and having a specific resistivity of $6.5 \times 10^{-4}$ ohm-in. was laminated by heat (125° C.) and pressure (10 psi) to a 0.003 inch thick polyurethane film (Staystik™ product number 672) containing aluminum nitride, to form a laminate tape. A copper conductive bus bar was placed at each end of the tape in contact with the flexible expanded graphite foil to facilitate an electrical connection. The laminate tape was then glued to an insulating layer with a rubber-based contact adhesive (1300-L, 3M Company) forming an adhesive layer of about 0.010 inches thick. The insulating layer consisted of 0.030 inch thick fiberglass cloth and a 0.030 inch rubber sheet. The three-layer laminate was then attached to the wing section by the same rubber-based contact adhesive with the same approximate thickness.

The copper bus bar at one end of the laminate was rivetted to the wing surface to provide physical contact between the bus bar and the wing. This contact supplied the ground end (−) for the hook-up to the power source. The second copper bus bar was insulated from the wing and connected to a wire for the positive (+) electrical connection to the power source.

The power source was an aircraft alternator capable of producing 38 volts DC and 150 amperes, but limited to 120 amperes-for the test. The alternator was driven by a 25 horsepower AC electrical motor to provide RPM equivalent to a typical general aviation engine. The alternator, equipped with voltage and ampere meters, was connected directly to the positive electrical wire connection. Self adhesive Omega iron/constantan thermal couples (Omega Engineering, Inc., Stamford, Conn.) were affixed to various points on the outer surface of the laminate at the leading edge of the wing to monitor temperature.

To test the capability of the laminate to heat the surface, the leading edge of the wing having the laminate bonded thereto was placed in an ice mold having the shape of the leading edge and temperature readings were taken periodically during the test. Power was provided to the laminate and the time to reach a given temperature was measured. The results are illustrated in Table 1.

As illustrated in the Table, the watt density achieved by the laminate was 5.62 to 6.75 watts per square inch. This watt density is about three times higher than that achieved by current wire heating pad systems proposed for aircraft. Moreover, at the energy level employed, the laminate produced a greater than 30° F. rise in the temperature at the leading edge of the wing in 30 seconds or less and a greater than 50° F. rise in the temperature within one minute.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

| Test Number | Temperature at Wing Leading Edge Time = 0 | Voltage Applied | Current (amperes) | Power (watts) | Watt Density[1] (watts/in$^2$) | Temperature Achieved | Time to Achieved Temperature |
|---|---|---|---|---|---|---|---|
| 1 | 31° F. | 18 | 25 | 450 | 5.62 | 67° F. | 30 seconds |
| 2 | 31° F. | 18 | 25 | 450 | 5.62 | 92° F. | 1 minute |
| 3 | 31° F. | 18 | 25 | 450 | 5.62 | 94° F. | 1½ minutes |
| 4 | 31° F. | 20 | 27 | 540 | 6.75 | 74° F. | 30 seconds |
| 5 | 31° F. | 20 | 27 | 540 | 6.75 | 85° F. | 1 minute |

[1]Watt density per surface area of 80 in$^2$.

I claim:

1. An aircraft structure comprising an outer surface that includes a leading edge, and a heat-conducting tape bonded to said outer surface for electro-thermally removing ice from or preventing the formation of ice on the outer surface during flight, wherein the heat-conducting tape comprises at least two layers laminated to each other under heat and pressure, the layers comprising (i) a non-metallic conductive layer connected to a power source, the non-metallic conductive layer consisting of a flexible expanded graphite foil sheet having an electrical resistivity of about $1\times10^{-4}$ ohm-inches to about $10\times10^{-4}$ ohm-inches and a thermal conductivity of about 140 W/M°K at 70° F., and (ii) an outer heat conducting layer that is an electrical insulator, having a volume resistivity of about $10^3$ ohm-inches to about $10^{12}$ ohm-inches, and a thermal conductivity of about 0.1 W/M°K to about 5 W/M°K.

2. The aircraft structure of claim 1, wherein the flexible expanded graphite foil sheet has a thickness of about 0.025 inches to about 0.125 inches.

3. The aircraft structure of claim 1, wherein the flexible expanded graphite foil sheet has a thickness of about 0.003 inches to about 0.070 inches.

4. The aircraft structure of claim 1, wherein the flexible expanded graphite foil sheet has a thickness of about 0.003 inches to about 0.030 inches.

5. The aircraft structure of claim 1, wherein the flexible expanded graphite foil sheet has a specific resistivity of about $2.8\times10^{-4}$ ohm-inches to about $7.5\times10^{-4}$ ohm-inches.

6. The aircraft structure of claim 1, wherein the flexible expanded graphite foil sheet has a specific resistivity of about $3.1\times10^{-4}$ ohm-inches to about $6.5\times10^{-4}$ ohm-inches.

7. The aircraft structure of claim 1, wherein the outer heat conducting layer comprises a thermoplastic or a thermosetting material and an inorganic filler that conducts heat.

8. The aircraft structure of claim 7, wherein the inorganic filler is selected from the group consisting of aluminum nitride, boron nitride, alumina, silicon nitride, and mixtures thereof.

9. The aircraft structure of claim 7, wherein the material comprises polyurethane.

10. The aircraft structure of claim 1, wherein the outer heat conducting layer has a thermal conductivity of about 0.5 W/M°K to about 4 W/M°K.

11. The aircraft structure of claim 1, wherein the outer heat conducting layer has a thickness of about 0.001 inches to 0.030 inches.

12. The aircraft structure of claim 1, wherein the outer heat conducting layer has a thickness of about 0.001 inches to about 0.010 inches.

13. The aircraft structure of claim 1, further comprising an electrically insulating layer, wherein the flexible expanded graphite foil sheet is disposed between the outer heat conducting layer and the insulating layer.

14. The aircraft structure of claim 13, wherein the insulating layer is a component of the heat-conducting tape or is a component of the aircraft surface.

15. The aircraft structure of claim 14, wherein the electrically insulating layer is a component of the heat-conducting tape and is bonded to the flexible expanded graphite foil sheet by an adhesive.

16. The aircraft structure of claim 15, wherein the heat-conducting tape is bonded to the outer surface of the aircraft structure by the adhesive bonding of the electrically insulating layer to the surface.

17. The aircraft structure of claim 13, wherein the insulating layer is a heat insulator.

18. The aircraft structure of claim 13, wherein the insulating layer has a thickness of about 0.005 inches to 0.250 inches.

19. The aircraft structure of claim 1, wherein the flexible expanded graphite foil sheet has a density of about 50 lbs. to about 90 lbs. per cubic foot.

20. The aircraft structure of claim 1, wherein the flexible expanded graphite foil sheet has a density of about 70 lbs. per cubic foot.

21. The aircraft structure of claim 1, wherein the heat-conducting tape is bonded to the outer surface of the aircraft structure by an adhesive.

22. A heat-conducting tape for application to an outer surface of an aircraft, wherein the outer surface includes a leading edge, for removing ice from or preventing the formation of ice on the outer surface, the heat-conducting tape comprising at least two layers laminated to each other under heat and pressure, the layers comprising (i) a non-metallic conductive layer for connection to a power source, the non-metallic conductive layer consisting of a flexible expanded graphite foil sheet having an electrical resistivity of about $1\times10^{-4}$ ohm-inches to about $10\times10^{-4}$ ohm-inches and a thermal conductivity of about 140 W/M°K at 70° F., and (ii) an outer heat conducting layer that is an electrical insulator, having a volume resistivity of about $10^3$ ohm-inches to about $10^{12}$ ohm-inches, and a thermal conductivity of about 0.1 W/M°K to about 5 W/M°K.

23. The heat conducting tape of claim 22, wherein the flexible expanded graphite foil sheet has a thickness of about 0.025 inches to about 0.125 inches.

24. The heat-conducting tape of claim 22, wherein the flexible expanded graphite foil sheet has a thickness of about 0.003 inches to about 0.070 inches.

25. The heat-conducting tape of claim 22, wherein the flexible expanded graphite foil sheet has a thickness of about 0.003 inches to about 0.030 inches.

26. The heat-conducting tape of claim 22, wherein the flexible expanded graphite foil sheet has a specific resistivity of about $2.8\times10^{-4}$ ohm-inches to about $7.5\times10^{-4}$ ohm-inches.

27. The heat-conducting tape of claim 22, wherein the flexible expanded graphite foil sheet has a specific resistivity of about $3.1\times10^{-4}$ ohm-inches to about $6.5\times10^{-4}$ ohm-inches.

28. The heat-conducting tape of claim 22, where in the outer heat conducting layer comprises a thermoplastic or a thermosetting material and an inorganic filler that conducts heat.

29. The heat-conducting tape of claim 28, wherein the inorganic filler is selected from the group consisting of aluminum nitride, boron nitride, alumina, silicon nitride, and mixtures thereof.

30. The heat-conducting tape of claim 28, wherein the material comprises polyurethane.

31. The heat-conducting tape of claim 22, wherein the outer heat conducting layer has a thermal conductivity of about 0.5 W/M°K to about 4 W/M°K.

32. The heat-conducting tape of claim 22, wherein the outer heat conducting layer has a thickness of about 0.001 inches to 0.030 inches.

33. The heat-conducting tape of claim 22, wherein the outer heat conducting layer has a thickness of about 0.001 inches to about 0.010 inches.

34. The heat-conducting tape of claim 22, further comprising an electrically insulating layer, wherein the flexible expanded graphite foil sheet is disposed between the outer heat conducting layer and the insulating layer.

35. The heat-conducting tape of claim 34, wherein the insulating layer is a heat insulator.

36. The heat-conducting tape of claim 34, wherein the insulating layer has a thickness of about 0.005 inches to 0.250 inches.

37. The heat-conducting tape of claim 34, wherein the electrically insulating layer is bonded to the flexible expanded graphite foil sheet by an adhesive.

38. The heat-conducting tape of claim 22, the flexible expandd graphite foil sheet has a density of about 50 lbs. to about 90 lbs. per cubic foot.

* * * * *